United States Patent Office 3,299,167
Patented Jan. 17, 1967

---

3,299,167
PHENOLIC ENCAPSULATING COMPOSITIONS
Paul D. Knowlson and Elliot Wilbur Simpson, North Tonawanda, and Minert E. Hull III, Kenmore, N.Y., assignors to Hooker Chemical Corporation, Niagara Falls, N.Y., a corporation of New York
No Drawing. Filed May 10, 1963, Ser. No. 279,620
18 Claims. (Cl. 260—829)

This invention relates to new phenolic resins and more particularly to phenolic resins useful for encapsulating electrical devices.

For many years there has been a growing trend in the electrical device manufacturing field to reduce the size of various parts. That is, there has been greater emphasis placed upon miniaturization of the respective component parts utilized in an electrical device. This trend has made it desirable to assemble the electrical device and then encapsulate or coat it with a non-electrical conductor material to seal out dirt, moisture and other objectionable foreign objects, to provide an electrical insulation for the device, and also to provide a protective cover. Various waxes, epoxy resins, silicone rubbers, miscellaneous polymers and blends of the foregoing have been used as encapsulating materials. However, these materials have not met with unqualified success since they were often deficient in one or more of the following properties: heat stability at operating temperatures, flow characteristics during encapsulation process, porosity, structural strength and expense. The encapsulating material also sometimes contained compounds which were detrimental to the device being encapsulated. The typical phenolic resin previously used by the electrical industry is unsatisfactory for this encapsulating process since the pressure required to force the phenolic resin to flow often damages the delicate electrical device being encapsulated.

There has now been discovered a new phenolic resin composition which possesses good flow properties, desirable electrical properties and yet retains the durability characteristics associated with phenolic resins. In accordance with this invention there is provided a phenolic resin comprised of the residues of phenol and furfuryl alcohol linked together by methylene linkages which are derived from aliphatic and heterocyclic aldehydes. A process for preparing these products is also within the invention, as is a process in which they are employed as encapsulating materials.

The invented resins are prepared by partially condensing furfuryl alcohol in the presence of an aliphatic aldehyde under acid conditions to make a precondensate, and then blending furfuraldehyde with the precondensate resin. Thereafter, the resulting resin is charged to a water solution of phenol-aldehyde novolac type resin which is then vacuum treated to remove water and achieve the desired softening point.

Examples of phenols which may be used in preparing phenolaldehyde condensates for use in practicing the invention include phenol itself and substituted phenols having the general formula:

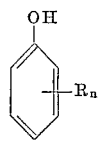

where R may be H, F, Cl, Br or a suitable substituent selected from the following:

(A) Alkyl groups of 1 to 18 carbon atoms in any of their isomeric forms and substituted on the phenolic nucleus in the ortho, meta, or para positions;

(B) Alicyclic groups of 5 to 18 carbon atoms such as cyclohexyl, cyclopentyl, methylcyclohexyl, butyl-cyclohexyl, and so forth;

(C) Aromatic or aralkyl groups of 6 to 18 carbon atoms such as alphamethylphenyl, benzyl, cumyl, phenylethyl, and so forth;

(D) Alkyl, alicyclic, aryl and aralkyl ketones wherein the hydrocarbon portion is as defined hereinbefore in (A), (B) or (C); and $n$ is an integer from 1 to 5, provided a minimum of two of the three ortho and para positions contain hydrogen.

Suitable substituted phenols include the following: para-tertiary-butylphenol, para-secondary-butylphenol, para-tertiary-hexylphenol, para-isooctyl-phenol, para-phenylphenol, para-benzylphenol, para-cyclohexylphenol, para-decyl-phenol, para-dodecyl-phenol, para-tetradecyl-phenol, para-octa-decylphenol, para-nonyl-phenol, para-methyl-phenol, para-beta-naphthyl-phenol, para-alpha-naphthyl-phenol, para-pentadecyl-phenol, para-cetyl-phenol, para-cumyl-phenol, para-hydroxyacetylphenol, hydroxyacetylphenol, para-hydroxybenzophenol, a phenol alkylated with limonene, a phenol alkylated with maleic acid, as well as the corresponding ortho and meta derivatives such as butyl phenol and orthobutylphenol, as well as mixtures thereof.

The pure refined phenols may be used, but this is not always necessary. For instance, the phenols may be alkylated and then reacted or condensed with an aldehyde as a crude product which may contain some polyalkylated as well as unalkylated phenols. Mixtures of phenols mentioned herein may also be used.

From the foregoing, it is apparent that a wide variety of phenols may be used in practicing the present invention provided that the phenol employed is sufficiently active to be capable of forming the desired condensates. All such compounds may be described under the class name phenol.

In producing the parent phenol-aldehyde and furfuryl alcohol-aldehyde condensates, any suitable aliphatic aldehyde or mixtures of aliphatic aldehydes capable of reacting with the phenol and having from 1 to 12 carbon atoms is satisfactory. Of course, it will not contain a functional group or structure which acts to prevent the resinification reaction nor will it be mixed with such a material. The preferred aldehyde is formaldehyde, which may be in an aqueous solution or in any of its lower polymeric forms such as paraformaldehyde or trioxane. Other examples of aldehydes include: 2-ethylhexanal, ethylbutyraldehyde, heptaaldehyde, glyoxal, isobutyraldehyde, and so forth.

The heterocyclic aldehydes which have been found useful in this invention are those five membered monohetero conjugated diene cyclic compounds wherein four members of the ring are carbon atoms and the fifth member is selected from the group consisting of oxygen, nitrogen and sulfur. The aldehyde group may occur at either the alpha or beta position of the ring structure. Especially preferred are those heterocyclic aldehydes having the furane ring structure. Additionally, these heterocyclic aldehydes may be alkylated with alkyl groups containing from 1 to 6 carbon atoms, in either normal, branched or substituted arrangements. Among other useful heterocyclic aldehydes are furfuraldehyde, methylfurfuraldehyde, thiophene aldehyde and pyrrole aldehyde.

The phenol-aldehyde furfuryl alcohol condensates should be soluble in organic solvents such as acetone or alcohol and it should not be advanced to the insoluble phenolic C stage or resite stage. These condensates are deficient in methylene linkages and therefore are permanently fusible. The addition of methylene linkage donors such as hexamethylenetetramine and heat will advance the resin to the insoluble, permanently set phenolic C stage.

Furfuryl alcohol constitutes the third major type of ingredient employed in preparing the resins of this invention. It is to be appreciated that equivalent alkylated furfuryl alcohols containing an alkyl group of 1 to 6 carbon atoms may also be employed alone or in combination with furfuryl alcohol where different rates of resinification may be desired. One such alkylated furfuryl alcohol is methyl furfuryl alcohol.

It is convenient to describe the resulting encapsulating resin composition in terms of the residues of the phenol, furfuryl alcohol and aldehydes. As the resinification proceeds, transitional groups may be temporarily formed and the resin chain becomes increasingly irregular with respect to repeating units and becomes more branched. At any given point of the resinification process, various inconsequential variations of resin structure will exist. Hence, it is most convenient to think of the resins in terms of what remains after the resin has obtained, either the soluble, fusible state or the final insoluble, infusible C state of resinification.

The furfuryl alcohol resin of this invention is prepared by condensing furfuryl alcohol with a small amount of aliphatic aldehyde under acid conditions until the desired degree of resinification has occurred. It has been found desirable to employ formaldehyde in the condensation of the furfuryl alcohol inasmuch as the formaldehyde is useful as a catalyst, reaction initiator, and as a resin structure modifier. The amount of aldehyde, e.g., formaldehyde, employed may vary from about two to about twelve percent of the furfuryl alcohol charged and preferably from about three to about seven percent. The condensation occurs under acidic conditions and at pH's of 3 to 4, the condensation rate is low. It is preferable that the pH be between 2 and 1. A very suitable range of pH is 1.3–1.6. The desired acidity is achieved by charging diluted acids such as sulfuric or hydrochloric acid to the reaction vessel. The condensation is most advantageously carried out at temperatures from about 25 degrees to about 100 degrees centigrade, and very suitable resin products are obtained by employing a temperature range from about 50 to about 80 degrees centigrade. When the desired degree of resinification has been obtained the reaction mixture may be neutralized by charging a suitable neutralizing agent, such as a slurry of lime, sodium bicarbonate, calcium bicarbonate or an alkali such as sodium hydroxide in solution. Thereafter the reaction mixture is vacuum treated to remove water and achieve the desired viscosity of the resin. A viscosity from about 1700 to about 2200 centipoises is suitable, however, lower viscosities may also be employed. At this point the desired amount of heterocyclic aldehyde is added and blended until an intimate mixture of the two is obtained. The amount of heterocyclic aldehyde to be admixed with the furfuryl alcohol resin may be varied within limits to obtain the particular degree of ultimate plasticity and resinification of the furfuryl alcohol resin desired. Based on the amount of furfuryl alcohol employed it is generally advantageous to employ from about 5 to about 35 percent heterocyclic aldehyde and preferably from about 10 to about 25 percent.

The resins of this invention may be prepared by charging the desired phenol-aldehyde raw materials and catalysts in selected quantities into a reaction vessel. The amount of aliphatic aldehyde to be condensed with the phenol may be varied to prepare novolacs of varying molecular weights. Suitably, the amount of aliphatic aldehyde varies from about 0.5 to 1.0 mole per mole of the phenol when the mono or difunctional phenol is used. In instances where a trifunctional phenol is used, a preferred upper limit of the aldehyde may be about 0.85 mole per mole of phenol so as to minimize the formation of insoluble and infusible condensates.

The novolac is prepared, using the above described ratios of aliphatic aldehyde to phenol, in the presence of an acid catalyst, such as sulfuric, hydrochloric, formic, tartaric or oxalic acid. Wetting agents of the anionic type such as sodium alkylarylsulfonate may speed up the reaction when weaker acids are used.

The novolac resinification proceeds under temperatures below about 200 degrees centigrade and at pressures below about 100 pounds per square inch for perhaps three hours until the desired degree of condensation has taken place. Although the reaction temperature may be as low as 25 degrees centigrade it is preferred that the reaction be maintained in the range from about 50 degrees to about 150 degrees centigrade. The resins may be conveniently prepared at atmospheric pressure. Upon the completion of the desired reaction the catalysts may be neutralized by charging to the reaction mixture a suitable neutralizing agent, such as an alkaline material, e.g., a slurry of lime, sodium bicarbonate, calcium bicarbonate or an alkali such as sodium hydroxide in solution.

The previously prepared furfuryl alcohol resin is charged to the neutralized reaction mixture. The amount of alcohol resin to be charged may be varied depending upon the exact amount of flow desired in the final encapsulating composition. Suitable resins may be prepared by charging from about 10 to about 150 percent of the amount of phenol employed in preparing the resin. Excellent encapsulating resins result when the furfuryl alcohol is employed in the amount from about 20 to about 80 percent of the amount of phenol utilized. The furfuryl alcohol resin is added slowly to the reaction mixture during admixing of the two fluids. Thereafter the reaction mixture is vacuum treated to remove water and to achieve the desired melting point of the brittle resin. The resulting resin is discharged, allowed to solidify and is ground to the desired particle size.

Thereafter the final encapsulating resin is prepared by admixing with the ground resin the desired amount of methylene link donor material such as hexamethylenetetramine and a plasticizer. The plasticizer may be a mixture of several types of plasticizers or just one. For convenience the addition of more plasticizer is deferred until the final encapsulating composition is prepared. A small amount of metallic soap such as the stearate of calcium, zinc, aluminum, barium or iron may be used as a plasticizer. The amount of cross-linking agent to be added may be varied from about four percent to about 15 percent and preferably is from about 6 to about 12 percent the amount of phenol aliphatic aldehyde condensate present in the ground resin. The amount of metallic soap generally employed will range from about 1 to about 5 percent and preferably is from about 2 to about 3 percent based upon the total amount of resin present.

The resins of this invention are characterized by their ability to flow at low temperatures and pressures and also by their rapid conversion to the hard, insoluble, infusible "C" stage of resinification. The ability to flow at low temperatures and pressures is conveniently measured by so-called "squeeze out" test. This test is performed at 100 degrees centigrade and consists of placing a lightly compacted pill of the resin between and in the center of two pieces of filter paper and placing the assembly between heated platens and applying a slight pressure. The upper platen has a surface area of approximately three inches by eight inches, weighs approximately 3 pounds and is electrically heated. The pill is prepared by compressing a 0.30 gram sample under pressure of 900 pounds per square inch into a pill having a diameter of ½ inch. The filter paper resin assembly is maintained between the two platens for 1 minute. Thereafter the paper resin assembly is removed and the diameter of the resulting resin configuration is conveniently measured at 3 points to determine the average diameter of the resin after flow.

Resins which have an average diameter after "squeeze out" of approximately 1.4 inches to 1.8 inches are very well suited for encapsulating applications. Resins useful for encapsulation should have a "squeeze out" value in the range from about 1.2 to about 2.0 inches. Those resins having a squeeze out value of 1.0 inch are generally too stiff for many encapsulating purposes and often would require pressures up to about 600 pounds per square inch for satisfactory application. Such pressures are generally considered to be unsatisfactory if delicate and intricate electronic parts are to remain intact during the encapsulating process.

The use of fillers and/or dyes with the compounds in this invention is optional and dependent upon the final properties desired in the encapsulating resin. Various fillers may be employed in order to change such properties as density or chemical resistance. These include ground asbestos, ground cotton floc, ground nylon flocs, marble flour, mica, clay, and calcium silicate. The Technology of Plastics and Resins, Mason, J. P. and Manning, J. F. Van Nostrand Co. (1945), at page 396 et seq. describes other fillers and mentions why modifications of a resin may be desirable. These fillers may be employed in any desired amount, up to about 100 parts of filler for 100 parts of the final resin containing cross-linking agents, described above. A suitable working range for these fillers is from about 20 to about 75 parts of filler.

Additional small amounts of plasticizer may be admixed with the filler and final resin to maintain the desired squeeze out value. Such a plasticizer may be present in amounts up to about 20 parts of plasticizer per 100 parts of final resin, although very suitable encapsulating compounds are prepared by the use of from about 5 to 15 parts of plasticizer. Suitable plasticizers include the metallic soaps previously mentioned, phthalate type plasticizers of the rubber and resin trade such as the dioctylphthalate and dibutylphthalate; mixtures of ortho and para toluene sulfonamides and nonionic surface active agents prepared by the addition of ethylene oxide to polypropylene glycols. Additionally these plasticizers may be chlorinated, as is methylpentachlorostearate.

The practice of this invention is illustrated by but not limited to the examples given below which describe preferred forms thereof. All parts are by weight and all temperatures are in degrees centigrade unless otherwise stated.

*Example 1*

A furfurylalcohol resin was prepared by charging to a reaction vessel or pot 1800 parts of furfuryl alcohol, 120 parts of water and 90 parts of formaldehyde (37 percent in water). After mixing, a mixture of 9 parts of water and 0.54 part of sulfuric acid was slowly added until a pH in the range of 1.3 to 1.6 was obtained. The vessel was then heated to 50 degrees. Thereafter the temperature was gradually increased to about 80 degrees and maintained at this temperature for about 3 hours until the desired degree of resinification was completed. The reaction mixture at this point had an index of refraction of about 1.535. A solution of 9 parts water and 0.54 part of sodium hydroxide was then charged to the reaction vessel. At this point, vacuum was applied and the resin was dehydrated, to a viscosity of about 2000 centipoise at 25 degrees. Thereafter 360 parts of furfuraldehyde was added and thoroughly mixed with the reaction product, after which the resin was discharged from the reaction vessel.

*Example 2*

Using the procedure of Example 1 a resin containing 1800 parts of furfuryl alcohol, 90 parts of formaldehyde and 360 parts of furfural was prepared. The resulting resin had a specific gravity of 1.215, a refractive index of 1.545 and a viscosity of 60 centipoise at 25 degrees.

*Example 3*

Using the procedure of Example 1 a resin containing 1800 parts of furfuryl alcohol, 90 parts of formaldehyde and 180 parts of furfural was prepared. The resulting resin had a specific gravity of 1.197, a refractive index of 1.540 and a viscosity of 60 centipoise at 25 degrees.

*Example 4*

Using the procedure of Example 1 a resin was prepared containing 1800 parts of furfuryl alcohol, 90 parts of formaldehyde and 90 parts of furfuraldehyde. The resulting resin had a specific gravity of 1.226, a refractive index of 1.545 and a viscosity of 2300 centipoise at 25 degrees.

*Example 5*

Using the procedure of Example 1 a resin was prepared containing 1800 parts of furfuryl alcohol and 90 parts of formaldehyde. The resulting resin had a specific gravity of 1.223, a refractive index of 1.545 and a viscosity of 30 centipoise at 25 degrees.

*Example 6*

An encapsulating resin was prepared by charging to the reaction vessel 100 parts of phenol, 1 part of sulphuric acid and 0.2 part of a sodium alkyl aryl sulfonate wetting agent. Heat was applied to the reaction vessel and the temperature was adjusted to 95 to 100 degrees after which 65 parts of formaldehyde (37 percent in water) was slowly added to the phenol. After all the formaldehyde was reacted, the reaction mixture was neutralized with a slurry of 0.5 part of lime and 1 part of water. Thereafter 20 parts of the furfuryl alcohol resin of Example 2 was slowly added and thoroughly mixed. Afterwards a vacuum was applied and the excess phenol and water was removed. The novolac type resin was discharged from the reaction pot, allowed to solidify and was crushed to desired size. The resulting resin had a melt point of 65 degrees and a clear melt point of 68 degrees, pH (20% water solution) 6.9, squeeze out value of 2.23 inches and did not harden at 165 degrees. A final resin mix was prepared by blending together 100 parts of this resin, 8.5 parts hexamethylenetetramine, 2 parts of clay and 2 parts of calcium stearate. This mixture when heated at 165 degrees cured in 34 seconds.

*Example 7*

Using the procedure of Example 6, a resin containing 100 parts of phenol, 65 parts of formaldehyde and 40 parts of the furfuryl alcohol resin of Example 3 was prepared. The resin had a shrink melt point of 68 degrees and a clear melt point of 72 degrees, pH (20% water solution) 7.3, squeeze out value of 2.25 inches and did not cure at 165 degrees.

A final resin mix was prepared by blending together 100 parts of resin, 8.5 parts hexamethylenetetramine, 2 parts of clay and 2 parts of calcium stearate. This mixture, when heated at 165 degrees, cured in 35 seconds.

*Example 8*

Using the procedure of Example 6 a resin was prepared with 100 parts of phenol, 65 parts of formaldehyde and 40 parts of the furfuryl alcohol resin of Example 4. The resulting resin had a shrink melt point of 52 degrees and a clear melt point of 62 degrees, pH (20% water solution) 8.5, a squeeze out value of 2.31 inches and did not cure at 165 degrees.

A final resin mix was prepared by blending together 100 parts of resin, 8.5 parts of hexamethylenetetramine, 2 parts of clay and 2 parts of calcium stearate. This mixture, when heated at 165 degrees, cured in 37 seconds.

*Example 9*

Using the procedure of Example 6, a resin was prepared with 100 parts of phenol, 65 parts of formaldehyde and 40 parts of the furfuryl alcohol resin of Example 5.

The resulting resin had a shrink melt point of 60 degrees, a clear melt point of 69 degrees, pH (20% water solution) 8.2, a squeeze out value of 2.48 and did not cure at 165 degrees.

A final resin mix contained 100 parts of resin, 8.5 parts of hexamethylenetetramine, 2 parts of clay and 2 parts of calcium stearate. This mixture, when heated at 165 degrees, cured in 40 seconds.

Encapsulating compositions were prepared by making a basic mixture of 100 parts of the final resin of Example 6, 10 parts of a nonionic polymeric plasticizer based on ethylene oxide and polypropylene glycol (except Example 10 which contained 6 parts), 2 parts of nigrosine dye and 4 parts of glycerol monostearate. Fillers in the amounts shown below were incorporated and the squeeze out values given were obtained. These compositions were suitable for encapsulating diodes in a transfer mold process at 165 degrees with cure cycle of about 45 seconds.

| Example | Filler | Squeeze out value |
|---|---|---|
| 10 | Paper floc, 50 parts | 1.79 |
| 11 | Asbestos, 40 mesh, 45 parts | 1.79 |
| 12 | Long Fiber Asbestos, 45 parts | 1.82 |
| 13 | Glass fiber, chopped ¼", 30 parts | 1.49 |
| 14 | Calcium carbonate, 300 mesh, 60 parts | 1.54 |
| 15 | Cotton floc, 14 mesh, 60 parts | 1.32 |
| 16 | Marble flour, 300 mesh, 60 parts | 1.32 |

When it is desired to obtain finished phenolic resin parts with very low moisture absorption, a portion of the novolac type resin may be replaced by the resole type phenolic resins. These resins are prepared in the same manner as novolac type resins except that the phenol to formaldehyde ratio is between 1:1.5 and 1:3 and an alkaline catalyst such as ammonia, sodium hydroxide, calcium hydroxide, potassium hydroxide, amines or quaternary ammonium bases is employed. Encapsulating resins containing resole type phenolic resin, in addition to the novolac type resin, are shown below. The resole type resin may optionally constitute up to about 50 percent of the total resin in the encapsulating compositions of this invention.

*Example 17*

An encapsulating resin was prepared by charging to the reaction vessel, 100 parts of phenol, 1.05 part of sulphuric acid and 0.2 part of a sodium alkyl aryl sulfonate wetting agent. Heat was applied to the reaction vessel and the temperature raised to about 97 degrees after which 65 parts of formaldehyde (37 percent formaldehyde in water solution) was slowly added subsurface to the phenol mixture. After all of the formaldehyde was reacted, the reaction mixture was neutralized with a slurry of 0.5 part of lime and 1 part of water. Then 20 parts of the furfural resin of Example 1 were slowly added and thoroughly mixed. Thereafter, a vacuum was applied and maintained until the unreacted water and phenol were removed. The novolac was then discharged, cooled, solidified and ground to the desired particle size. The resulting resin had melting points of 55 degrees shrink and 63 degrees clear.

50 parts of the above resin, 50 parts of a resole resin, 8.5 parts of hexamethylenetetramine and 2 parts of zinc stearate were admixed together. This resin mixture had a squeeze out value of 1.87 inches and cured in 27 seconds at 165 degrees.

*Example 18*

Using the procedure of Example 17, 100 parts of phenol, 1 part of sulfuric acid, 60 parts of formaldehyde and 40 parts of furfuryl alcohol resin were reacted to producing novolac having melting points of 60 degrees shrink and 67 degrees clear. The novolac had a pH (water solution) of 7.8. A mixture of 50 parts of this novolac, 50 parts of resole resin, 8.5 parts of hexamethylenetetramine and 2 parts of zinc stearate was prepared. The mixture had a squeeze out value of 2.18 inches and cured to the insoluble infusible "C" state of resinification in 35 seconds at 165 degrees.

*Example 19*

Using the procedure of Example 17, a resin containing 100 parts of phenol and 1 part of sulfuric acid, 60 parts of formaldehyde and 40 parts of the resin of Example 1 was prepared. This resin had a shrink melt point of 58 degrees and a clear melt point of 63 degrees, as well as a pH of 7.4. A mixture of 50 parts of this novolac resin, 50 parts resole resin, 8.5 parts of hexamethylenetetramine and 2.0 parts of zinc stearate was prepared. This mixture had a squeeze out value of 1.95 inches and cured in 38 seconds at 165 degrees.

*Example 20*

Using the procedure of Example 17 a resin was prepared employing 100 parts of phenol, 1 part of sulfuric acid, 65 parts of formaldehyde and 80 parts of the resin of Example 1. This resin had a shrink melt point of 58 degrees and a clear melt point of 65 degrees. The pH was 7.3. A mixture of 50 parts of this novolac, 50 parts resole resin, 8.5 parts of hexamethylenetetramine and 2 parts of the zinc stearate was prepared. This resin mixture had a squeeze out value of 1.85 inches and required 42 seconds to cure at 165 degrees.

*Example 21*

Using the procedure of Example 17 a resin employing 100 parts of phenol, 1 part of sulfuric acid, 65 parts of formaldehyde and 150 parts of the resin of Example 1 was prepared. This resin had a shrink melt point of 55 degrees and a clear melt point of 59 degrees. The pH was 7.1. A mixture of 50 parts of this novolac, 50 parts resole, 8.5 parts of hexamethylenetetramine and 2 parts of zinc stearate was prepared. This mixture had a squeeze out value of 1.78 inches and required 56 seconds to cure at 165 degrees.

Encapsulating compositions were prepared by making a basic mixture of 100 parts of the final resin of Example 18, 10 parts of a nonionic polymeric plasticizer based on ethylene oxide and polypropylene glycol synthetic detergent, 2 parts of nigrosine dye and 0.2 part of glycerol monostearate. In portions of this mixture various fillers were incorporated, as are listed below. These compositions were suitable for encapsulating resistors, coils, and so forth in a transfer mold process.

| Example | Filler | Squeeze out value, inches |
|---|---|---|
| 22 | 60 parts of 40 mesh asbestos | 1.81 |
| 23 | 60 parts of 14 mesh cotton floc | 1.80 |
| 24 | 60 parts of 14 mesh nylon floc | 1.80 |
| 25 | 30 parts of 300 mesh marble flour / 30 parts of 200 mesh calcium silicate | 1.73 |
| 26 | 60 parts of 300 mesh mica | 1.78 |
| 27 | 60 parts of 325 mesh clay | 9.75 |

*Example 28*

An encapsulating composition containing 100 parts of the resin of Example 18, 2 parts nigrosine dye, 0.2 part glycerol monostearate, 100 parts of calcium stearate and 30 parts of marble flour was prepared. The resulting composition had a squeeze out value of 1.32 inches.

*Example 29*

An encapsulating composition containing 100 parts of the resin of Example 18, 2 parts of nigrosine dye, 12 parts of glycerol monostearate, 30 parts calcium stearate, and 30 parts of marble flour was prepared. The resulting composition had a squeeze out value of 1.66 inches. The composition was suitable for encapsulating electrical coils in a transfer mold process at 165 degrees and about 90 seconds' cure time.

*Example 30*

An encapsulating composition containing 100 parts of a resin similar to that of Example 21 and having the proportion of 375 parts phenolic resins and 500 parts furfuryl alcohol resin, 2 parts of nigrosine dye, 0.2 part glycerol monostearate, 30 parts calcium stearate and 30 parts of marble flour was prepared. The resulting composition had a squeeze out value of 1.63 inches.

Encapsulating compositions were prepared by making a basic mixture of 100 parts of the final resin of Example 18, 2 parts of nigrosine dye, 0.2 part of glycerol monostearate, 30 parts of calcium stearate and 30 parts of marble flour. To portions of this mixture were added plasticizers in various amounts as indicated below.

| Example | Plasticizer | Squeeze out value |
| --- | --- | --- |
| 31 | Dibutyl phthalate, 10 parts | 1.81 |
| 32 | Toluenesulfonamide, 10 parts | 1.78 |
| 33 | Methylpentachlorostearate, 10 parts | 1.74 |

*Example 34*

An encapsulating composition was prepared containing 750 parts of the final resin mix of Example 6, 150 parts of calcium silicate, 250 parts of marble flour, 10 parts of nigrosine dye, 75 parts of plasticizer based on a polymer of ethylene oxide and polypropylene glycol and 20 parts of glycerol monostearate. The resin was cured at 165 degrees and had the following properties. Satisfactory heat resistance after 2 hours at 400 degrees Fahrenheit; excellent smooth glossy appearance; flexural modulus of 8,760 pounds per square inch, Izod impact resistance of 0.3 ft. lbs./inch of notch; tensile strength of 6,120 pounds per square inch and a squeeze out value of 1.70 inches. The composition was suitable for encapsulating capacitors in a multiple cavity mold in a transfer mold process at 165 degrees curing in about 45 seconds.

*Example 35*

An encapsulating composition was prepared containing 750 parts of the final resin of Example 18, 200 parts of marble flour, 200 parts of calcium silicate, 75 parts of polymeric plasticizer based on ethylene oxide and polypropylene glycol, 20 parts of glycerol monostearate and 10 parts of nigrosine dye. The resin was cured at 165 degrees and had the following properties: satisfactory heat resistance after 2 hours at 500 degrees Fahrenheit; excellent smooth glossy appearance; flexure modulus of 7,850 pounds per square inch; notch Izod impact of 0.27 foot pound per inch of notch; tensile strength of 4,800 pounds per square inch; dielectric strength, volts per mil (short time) of 325; average arc resistance of 106; and a squeeze out value of 1.70 inches. This composition was suitable for encapsulating diodes in a transfer mold process at 165 degrees curing in about 45 seconds.

The encapsulating compositions of Examples 10–16 and 22–35 show excellent heat resistance for short periods of time. These compounds possess the same characteristics which are generally associated with electrical grade phenolic resins. Furthermore, these encapsulating compositions show desirable corrosion- and stain-resistant properties, when contacted with metals and alloys used in preparing electrical circuits such as nickel, copper, zinc, gold, tin, brass and silver.

The encapsulating compositions of this invention are well suited to the encapsulating of small delicate electrical parts such as coils, condensers, resistors, diodes, capacitors and miniaturized printed circuits and combinations of the above parts. A typical size range for many of these parts is from about 1/16 inch diameter by 3/8 inch long to about 1/8 inch diameter to about 3/4 inch long. It is to be appreciated, however, that these parts have a wide range of sizes and parts such as coils and printed circuits may be many times larger than parts such as resistors and diodes.

The above described parts may be encapsulated or packaged by the transfer molding technique of the plastic article manufacturing industry. Typically, this technique consists of filling the material hopper with the encapsulating material and then charging controlled amounts to the loading well. As the plunger moves into the loading well, pressure is exerted, a softened condition is reached and the encapsulating material is forced through a narrow gate into the mold cavity where material surrounds the previously placed electrical part and final curing of the encapsulating material then occurs. The cured product is removed, another electrical device is positioned in the mold and the encapsulating sequence is repeated.

To encapsulate one or more delicate electrical or electronic components the part should be completely surrounded with a solid, high-density molding compound such as those described previously, which will protect the elements from moisture, thermal insulation, voltage insulation, and add physical strength.

The mold design should provide a cavity that will suitably support and anchor the item or items to be surrounded by the molding compound. The transfer method of molding is therefore preferred to insure proper anchorage of the elements. The material should be introduced into the cavity by means of a runner and gate. Gates may be extremely thin, such as about .008–.010 inch in depth and width, to suit the particular part. The lateral runner system is used where each cavity is being fed individually from a main runner. In another method, similar to nitrile rubber transfer molding, rubber gating or through gate method in which one cavity may be fed from the runner and additional cavities may be fed from cavity to cavity. The smaller the runner and gate in cross-sectional area, the better chance of good density and reduction of cure time. It is important for the cavities to be vented properly for escape of air or gases. Molds should fit extremely close and all surfaces should be ground flat to eliminate flashing of the mold over the flash line, even at the low plunger pressures required. Chrome-plated molds are recommended but are not always required. Prehardened steel can be used and for short runs, soft metals may be considered. Standard knock-out procedures may be employed since the molded parts are rigid on ejection from the mold.

The molding pressure in pounds per square inch may vary over a wide range. Pressures as low as 25–50 pounds per square inch have been used successfully in encapsulating delicate elements such as coils, and so forth. The construction or physical makeup of the electrical elements will help to determine pressures employed. Delicate elements may resuire about 25–50 pounds per square inch whereas others may with-stand pressures in the 700–1000 pounds per square inch range.

Factors having greatest effect on pressure requirements to produce solid homogeneous parts are: runner and gate size; mold temperature; length or distance of flow required, and preheat temperature of the molding compound.

The low pressure materials will become very plastic when molded with no preheat; however, more consistant results may be obtained if controlled preheat is used. The material may be preheated in loose powder form, contained in glass, paper, or styrene containers. Performs can be preheated with uniform preheat temperature throughout the preform, and the material can be readily preformed in hydraulic or mechanical preforms. Infrared, oven, or other preheating methods may be used; however, the high frequency method is preferred. The material preheats rapidly in a matter of a few seconds. When employed it is preferable that the preheat temperature be in the range from about 150 to about 175 degrees Fahrenheit.

The encapsulating compositions of this invention may be molded and cured at temperatures from about 250 to 375 degrees Fahrenheit. Additional curing time will be required when temperatures from about 250 to about 275 degrees Fahrenheit are employed while the time required is greatly reduced at the 350 to 375 degree Fahrenheit temperature range. Cures are obtained in about 20 to 200 seconds at the above temperatures. When encapsulating printed circuits temperatures as low as about 220 degrees Fahrenheit may be necessary to avoid damage to the part and then time to obtain a cure may be as much as 5 to 10 minutes.

Increasing mold temperature may decrease plunger pressure requirements, providing runner and gate cross-sectional area are sufficient to keep material from reacting too fast and curing in the runner and gate system. The most economical molding cycle must be determined by proper gate and runner size and should preferably include the highest possible mold temperature in relation to realistic plunger pressure that will not harm or distort delicate electronic components.

Various changes and modifications may be made and equivalents may be substituted in the method and composition of this invention, certain preferred forms of which have been herein described, without departing from the scope of this invention. Such modifications are to be regarded as within the scope of the invention.

What is claimed is:

1. A process for preparing encapsulating resins which comprises (A) preparing a furfuryl alcohol condensation resin product which comprises condensing furfuryl alcohol with an aliphatic aldehyde in the presence of an acid catalyst, neutralizing the reaction mixture and thereafter admixing a heterocyclic aldehyde which is a five membered monohetero conjugated diene cyclic compound wherein four members of the ring are carbon atoms and the fifth member is selected from the group consisting of oxygen, nitrogen and sulfur, with the furfuryl alcohol condensation resin product (B) preparing a phenol-aliphatic aldehyde condensation resin product which comprises condensing a phenol with an aliphatic aldehyde in the presence of a catalyst and thereafter neutralizing the reaction mixture (C) admixing the said furfuryl alcohol condensation resin product and said phenol-aliphatic aldehyde condensation resin product and thereafter (D) removing water therefrom until the desired melting point of the resin is achieved.

2. A process for preparing encapsulating resins which comprises (A) preparing a furfuryl alcohol condensation resin product which comprises condensing furfuryl alcohol with an aliphatic aldehyde in the presence of an acid catalyst, neutralizing the reaction mixture and thereafter admixing a furane aldehyde with the reaction product (B) preparing a phenol-aliphatic aldehyde condensation resin product which comprises condensing phenol with an aliphatic aldehyde in the presence of a catalyst and thereafter neutralizing the reaction mixture, (C) admixing the products of steps (A) and (B), (D) removing water by vacuum means until the desired melting point of the resin is achieved, (E) cooling, solidifying and crushing the resin and thereafter (F) mechanically admixing with the resin a methylene linkage donor and plasticizer.

3. A product of the process which comprises (A) preparing a furfuryl alcohol condensation resin product by condensing furfuryl alcohol with an aliphatic aldehyde in the presence of an acid catalyst, neutralizing the reaction mixture and thereafter mixing a heterocyclic aldehyde which is a five membered monohetero conjugated diene cyclic compound wherein four members of the ring are carbon atoms and the fifth member is selected from the group consisting of oxygen, nitrogen and sulfur, with the furfuryl alcohol condensation resin, (B) preparing a phenol-aliphatic aldehyde condensation resin product by condensing a phenol with an aliphatic aldehyde in the presence of a catalyst and thereafter neutralizing the reaction mixture, (C) admixing the products of steps (A) and (B), and thereafter (D) removing water from the product until the desired melting point of the resin is achieved.

4. The product of claim 3 wherein the heterocyclic aldehyde is a furane aldehyde.

5. The product of claim 4 wherein the aliphatic aldehyde is formaldehyde and the furane aldehyde is furfuraldehyde.

6. A product of the process which comprises (A) preparing a furfuryl alcohol condensation resin product by condensing furfuryl alcohol with an aliphatic aldehyde in the presence of an acid catalyst, neutralizing the reaction mixture and thereafter admixing a furane aldehyde with the reaction product, (B) preparing a phenol-aliphatic aldehyde condensation resin product by condensing phenol with an aliphatic aldehyde in the presence of a catalyst and thereafter neutralizing the reaction mixture, (C) admixing the products of steps (A) and (B), (D) removing water from the product by vacuum distillation until the desired melting point of the resin is achieved, (E) cooling and subdividing the resulting resin, and thereafter (F) admixing the resin with a methylene donor compound and a plasticizer.

7. The product of claim 6 wherein the aliphatic aldehyde is formaldehyde, the furane aldehyde is furfuraldehyde, and the methylene donor compound is hexamethylenetetramine.

8. A reaction product of a phenol-aliphatic aldehyde condensation resin product, a furfuryl alcohol-aliphatic aldehyde condensation resin product, and a heterocyclic aldehyde which is a five membered monohetero conjugated diene cyclic compound wherein four members of the ring are carbon atoms and the fifth member is selected from the group consisting of oxygen, nitrogen and sulfur.

9. The product of claim 8 wherein the heterocyclic aldehyde is furane aldehyde.

10. The product of claim 9 wherein the aliphatic aldehyde is formaldehyde and the furane aldehyde is furfuraldehyde.

11. A resin composition comprised of (1) a reaction product of a phenol-aliphatic aldehyde condensation resin product, a furfuryl alcohol-aliphatic aldehyde condensation resin product and a heterocyclic aldehyde which is a five membered monohetero conjugated diene cyclic compound wherein four members of the ring are carbon atoms and the fifth member is selected from the group consisting of oxygen, nitrogen and sulfur, (2) a methylene donor compound.

12. The resin composition of claim 11 having a plasticizer admixed therewith, and wherein the heterocyclic aldehyde is a furane aldehyde and the methylene donor is hexamethylenetriamine.

13. The resin composition of claim 12 having a filler admixed therewith.

14. A resin composition comprised of (1) a reaction product of a phenol-aliphatic aldehyde novolac resin product, a furfuryl alcohol-aliphaitc aldehyde condensation resin product, and a heterocyclic aldehyde which is a five membered monohetero conjugated diene cyclic compound wherein four members of the ring are carbon atoms and the fifth member is selected from the group consisting of oxygen, nitrogen and sulfur, (2) a phenol-aliphatic aldehyde resole resin product, and (3) a methylene donor compound.

15. The resin composition of claim 14 having a plasticizer admixed therewith, and wherein the heterocyclic aldehyde is a furane aldehyde and the methylene donor compound is hexamethylenetetramine.

16. The resin composition of claim 15 having a filler admixed therewith.

17. A process for encapsulating electrical parts which comprises (A) inserting the electrical part into a preheated mold, (B) injecting into the mold an encapsulating resin comprised of the reaction product of a phenol-aliphatic aldehyde condensation resin product, a furfuryl alcohol-aliphatic aldehyde condensation resin product and a heterocyclic aldehyde which is a five membered monoheteroconjugated diene cyclic compound wherein four members of the ring are carbon atoms and the fifth member is selected from the group consisting of oxygen, nitrogen and sulfur, and (C) maintaining the mold temperature until the encapsulating resin is advanced to the infusible insoluble state.

18. A process for encapsulating electrical parts which comprises (A) inserting the electrical part into a preheated mold, (B) liquefying an encapsulating composition comprised of the product of the reaction which comprises (1) preparing a furfuryl alcohol condensation resin product by condensing furfuryl alcohol with an aliphatic aldehyde in the presence of an acid catalyst, neutralizing the reaction mixture, and thereafter admixing a heterocyclic aldehyde which is a five membered monohetero conjugated diene cyclic compound wherein four members of the ring are carbon atoms and the fifth member is selected from the group consisting of oxygen, nitrogen and sulfur, with the furfuryl alcohol condensation resin product, (2) preparing a phenol-aliphatic aldehyde condensation resin product by condensing a phenol with an aliphatic aldehyde in the presence of a catalyst and thereafter neutralizing the resin mixture, (3) admixing the products of steps (1) and (2), and thereafter (4) removing water from the product until the desired melting point of the resin is achieved, (C) injecting into the mold said resin and (D) maintaining the mold temperature until the ancapsulating resin composition is advanced to the insoluble infusible state.

References Cited by the Examiner

UNITED STATES PATENTS

| | | | |
|---|---|---|---|
| 2,320,536 | 6/1943 | Pollack et al. | 117—65.2 |
| 2,343,972 | 3/1944 | Harvey | 260—829 |
| 2,471,631 | 5/1949 | Lebach | 260—829 |
| 2,970,121 | 1/1961 | Schmittberger | 260—829 |
| 3,043,804 | 7/1962 | Delmonte | 260—829 |
| 3,110,623 | 11/1963 | Feild | 117—232 |

MURRAY TILLMAN, *Primary Examiner.*

J. C. BLEUTGE, *Assistant Examiner.*

UNITED STATES PATENT OFFICE
CERTIFICATE OF CORRECTION

Patent No. 3,299,167                  January 17, 1967

Paul D. Knowlson et al.

It is hereby certified that error appears in the above numbered patent requiring correction and that the said Letters Patent should read as corrected below.

Column 1, line 58, for "phenolaldehyde" read -- phenol-aldehyde --; column 2, line 68 and column 3, lines 2 and 22, for "C", each occurrence, read -- "C" --; colum 5, line 7, for "aften" read -- often --; column 8, in the table, third column, line 9 thereof, for "9.75" read -- 1.75 --; column 10, line 54, for "resuire" read -- require --; line 63, for "consistant" read -- consistent --; line 66, for "Performs" read -- Preforms --; column 11, lines 2 and 3, for "250 to 375 degrees" read -- 250 to about 375 degrees --; column 12, line 58, for "aliphaitc" read -- aliphatic --; column 13, line 4, for "heteroconjugated" read -- hetero conjugated --; column 14, line 8, for "ancapsulating" read -- encapsulating --

Signed and sealed this 27th day of May 1969.

(SEAL)
Attest:

EDWARD M. FLETCHER, JR.
Attesting Officer                  Commissioner of Patents